USO10572848B2

United States Patent
Sen et al.

(10) Patent No.: US 10,572,848 B2
(45) Date of Patent: Feb. 25, 2020

(54) SYSTEM AND METHOD FOR INTELLIGENT PROJECT SCHEDULE FORECASTING

(71) Applicant: ORACLE INTERNATIONAL CORPORATION, Redwood Shores, CA (US)

(72) Inventors: Aditya Sen, Kolkata (IN); Priyamvada Tiwari, Bangalore (IN); Manish Kumar, Bangalore (IN); Vaibhav Aparimit, Bokaro Steel (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 938 days.

(21) Appl. No.: 14/571,614

(22) Filed: Dec. 16, 2014

(65) Prior Publication Data

US 2016/0171406 A1 Jun. 16, 2016

(51) Int. Cl.
*G06Q 10/06* (2012.01)
*G06F 3/0484* (2013.01)
*G06T 11/20* (2006.01)

(52) U.S. Cl.
CPC ..... *G06Q 10/06375* (2013.01); *G06F 3/0484* (2013.01); *G06Q 10/0639* (2013.01); *G06Q 10/06313* (2013.01); *G06T 11/206* (2013.01)

(58) Field of Classification Search
CPC .... G06F 17/30572; G06F 17/18; G06T 11/20; G06T 11/203; G06T 11/206; G06Q 10/06375; G06Q 10/06313; G06Q 10/0639

See application file for complete search history.

(56) References Cited

U.S. PATENT DOCUMENTS

| | | | |
|---|---|---|---|
| 6,519,763 B1 | 2/2003 | Kaufer et al. | |
| 8,103,948 B2 | 1/2012 | Cox et al. | |
| 8,775,229 B1* | 7/2014 | Danskin ........... | G06Q 10/06311 705/7.22 |
| 8,875,088 B1* | 10/2014 | Holler .................. | G06Q 10/10 717/101 |
| 2002/0077842 A1 | 6/2002 | Charisius et al. | |
| 2005/0039163 A1* | 2/2005 | Barrett ................. | G06Q 10/00 717/105 |
| 2005/0289503 A1 | 12/2005 | Clifford | |
| 2006/0167736 A1 | 7/2006 | Weiss | |
| 2007/0124186 A1 | 5/2007 | Virine | |

(Continued)

OTHER PUBLICATIONS

Collabnet.inc, Scrum Works Pro—Documentation Reports, Release Burndown by Date; downloaded on Jul. 10, 2014 from: http://www.danube.com/docs/scrumworks/pro/latestreports.html; pp. 1-14 (Year: 2014).*

(Continued)

*Primary Examiner* — Christine M Behncke
*Assistant Examiner* — Shelby A Turner
(74) *Attorney, Agent, or Firm* — Kraguljac Law Group, LLC

(57) ABSTRACT

Systems, methods, and other embodiments for providing scheduling of activities of a project plan associated with a computer application are described. In one embodiment, a project scheduling tool is configured to calculate a percentage time deviation, between an updated time duration and a planned time duration, for each present activity of a project to form a plurality of percentage time deviations. An arithmetic mean of the plurality of percentage time deviations is calculated and a planned time duration of at least one future activity of the project, related to each present activity, is transformed based on the arithmetic mean.

17 Claims, 13 Drawing Sheets

(56) References Cited

U.S. PATENT DOCUMENTS

| | | | | |
|---|---|---|---|---|
| 2008/0172630 | A1* | 7/2008 | Dang | G06T 11/206 |
| | | | | 715/771 |
| 2009/0055228 | A1* | 2/2009 | Henry | G06Q 10/06311 |
| | | | | 705/7.17 |
| 2009/0276260 | A1* | 11/2009 | Douglas | G06Q 10/06 |
| | | | | 705/7.22 |
| 2013/0325763 | A1* | 12/2013 | Cantor | G06Q 10/0633 |
| | | | | 706/12 |

OTHER PUBLICATIONS

Progress Control—What should you be spending your time doing?; downloaded on Jul. 9, 2014 from: http://www.successful-project-management.com/progress-control.html; pp. 1-6.

Rally Software Development Corp., Progress Charts / Rally Help; 2014; downloaded on Jul. 10, 2014 from: https://help.rallydev.com/progress-reports; pp. 1-11.

Targetprocess, Inc., Burn Down Chart for Release and Sprint; downloaded on Jul. 10, 2014 from: https://guide.targetprocess.com/reports/burn-down-chart.html; pp. 1-4.

Collabnet.inc, Scrum Works Pro—Documentation Reports, Release Burndown by Date; downloaded on Jul. 10, 2014 from: http://www.danube.com/docs/scrumworks/pro/latest/reports.html; pp. 1-14.

Fastworks, Fastworks Project Trend User Guide—Overview of Trend Chart Functionality; downloaded from: http://www.lateralworks.com/fastproject/files/fp_trend_guide.pdf; pp. 1-17.

Robert K. Wysocki, Effective Project Management, Traditional, Agile, Extreme, Seventh Edition; 2014—"Earned Value Analysis" section—pp. 282-287; published by John Wiley & Sons, Inc., Indianapolis, IN.

* cited by examiner

Default Trend Start and Finish

Only Trend Start Modified

| | Activity Number | Planned Duration (days) | Actual / Projected* Duration (days) | Percentage Deviation |
|---|---|---|---|---|
| ☑ | 1 | 5 | 6 | +20 % |
| ☑ | 2 | 5 | 5 | 0 % |
| ☑ | 3 | 10 | 9 | -10 % |
| ☑ | 4 | 8 | 10 | +25 % |
| ☐ | 5* | 5 | 7 | +40 % |
| ☑ | 6* | 8 | 7 | -12.5 % |

(*- *Ongoing activity*)

| Activity | Projected Duration | Projected Start Date | Projected Finish Date |
| --- | --- | --- | --- |
| Concrete Construction | | | |
| Form/Pour Concrete Foundation | 18 | 30 Sep | 23 Oct |
| Concrete Foundation Walls | 9 | 23 Oct | 5 Nov |
| Backfill and Compact Walls | 9 | 5 Nov | 18 Nov |
| Concrete First Floor | 12 | 18 Nov | 4 Dec |
| Plumbing | | | |
| Install underground water lines | 8 | 21 Oct | 31 Oct |
| Install bathroom fixtures | 6 | 3 Nov | 10 Nov |
| Connect taps to water lines | 4 | 10 Nov | 14 Nov |
| Electrical Work | | | |
| Connect to grid | 8 | 4 Dec | 16 Dec |
| Internal wiring | 10 | 16 Dec | 30 Dec |
| Install lighting | 7 | 30 Dec | 8 Jan |

SYSTEM AND METHOD FOR INTELLIGENT PROJECT SCHEDULE FORECASTING

BACKGROUND

A project can be loosely defined as an endeavor to achieve a specific goal, subject to some limiting constraints such as time and resources. Projects occur everywhere and may be of various scopes and importance. Some examples of projects include mapping the human genome, building the golden gate bridge, putting a satellite into orbit, and renovating a kitchen.

Managing a project can be a complicated affair, so much so that "Project Management" has become a small industry by itself. There are books, professional bodies, consultants, and scores of software tools to aid in the process of project management. Useful as all of these may be, delays in projects that can lead to project failure are still alarmingly prevalent.

Projects today are often plagued by varied problems that can lead to schedule overruns and, sometimes, outright project failure. Today, project managers are restricted by the limitations of scheduling functionality provided by various project management software solutions. A scheduler in such software often takes the project plan and any progress recorded as the input, and provides a forecasted finish date as the output. It does so typically by assuming that the remainder of the work will proceed at the planned pace. While useful, the forecasts made by such schedulers are frequently inaccurate. They do not take into account the ground realities of the project, even those for which the project manager is aware.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIG. 10 illustrates one example embodiment of how the project scheduling tool of FIG. 1 determines a representative rate of progress for activities of a project within a related project category using the method of FIG. 9;

FIGS. 11-12 illustrate one example embodiment of how the project scheduling tool of FIG. 1 forecasts a completion date for a project by rolling up activities across categories of the project using the method of FIG. 9.

DETAILED DESCRIPTION

Figure 1:
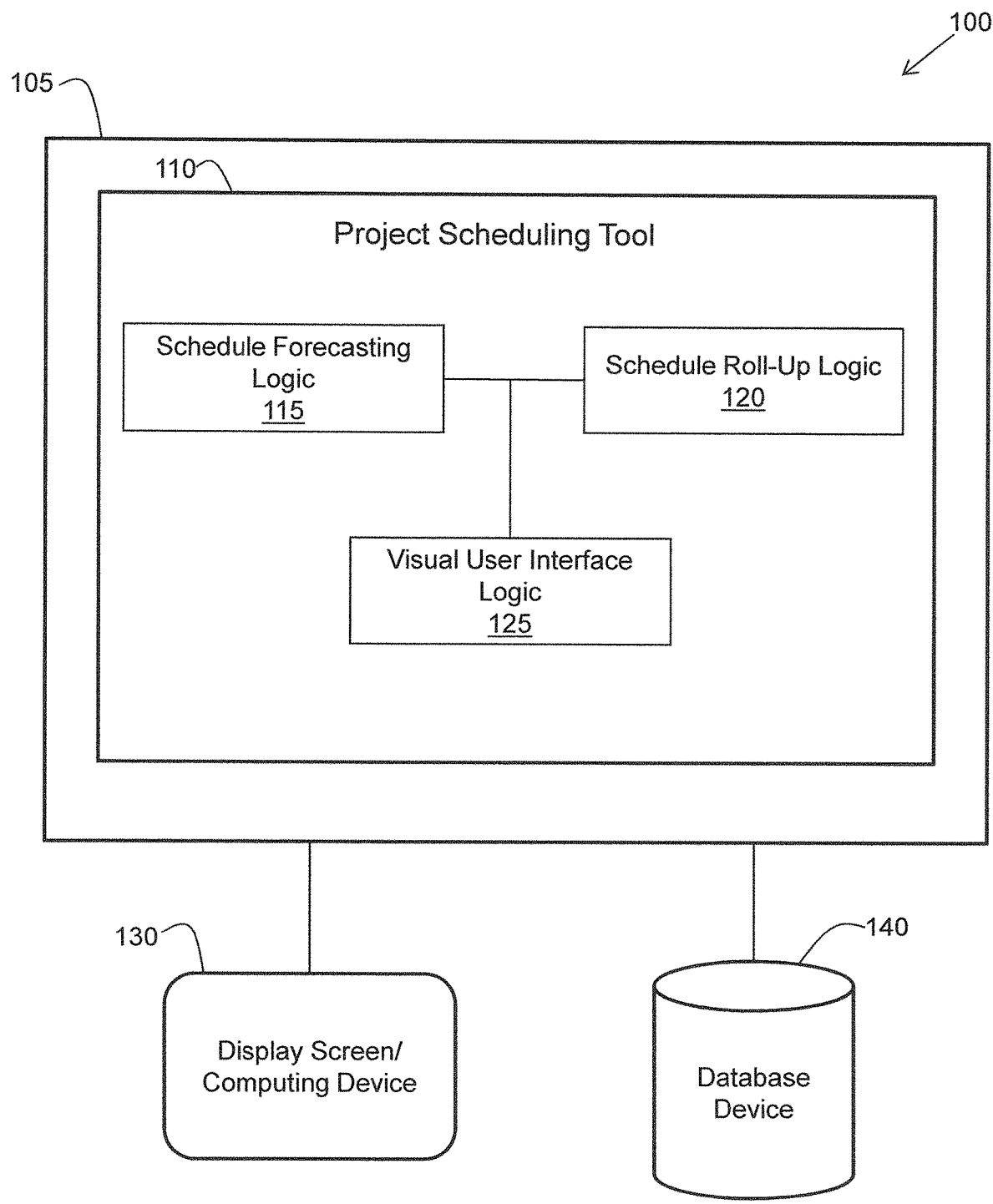
FIG. 1 illustrates one embodiment of a computer system, having a computing device configured with a project scheduling tool.

The following terms are used herein with respect to various embodiments.

The term "present activity", as used herein, may refer to a completed activity or an on-going activity. An on-going activity is an activity that has started but is not completed. The terms "on-going activity" and "partially completed activity" may be used interchangeably herein. The term "future activity", as used herein, refers to an activity that has not started. The term "uncompleted activity", as used herein, may refer to an on-going activity or a future activity.

The term "time duration", as used herein, refers to a duration of time over which an activity or project is to be or has been performed. The term "planned time duration", as used herein, refers to an initial expected duration of time over which an activity or project is to be performed. The term "actual time duration", as used herein, refers to a past duration of time during which an activity or project was fully or partially completed.

The term "updated time duration", as used herein, refers to a time duration of an activity or a project that has been changed or transformed from some previous time duration (e.g., from a planned time duration or from a previously updated time duration). For example, an updated time duration may be the result of a new estimate or projection for completing an activity or project. Furthermore, an updated time duration may be the result of an activity or project being completed and is equivalent to an actual time duration.

Systems, methods, and other embodiments for facilitating the forecasting of activity and project time durations and completion dates of a project plan associated with a computer application are disclosed. Example embodiments are discussed herein with respect to computerized project scheduling, where activities are defined and are to be performed over scheduled time periods. Some activities are related by one or more of timing with respect each other, common category (similar type of activities), or common resources used to complete the activities. In one embodiment, a project scheduling tool is disclosed that is configured to intelligently forecast an accurate completion date for an on-going project and for the on-going tasks and activities making up the project plan of the project.

In one embodiment, the project scheduling tool is configured to handle projects composed of activities that are largely similar in nature as well as more complex projects composed of activities that are widely dissimilar. A project scheduling tool takes into account project units (e.g., units of work) logged over elapsed periods of time of the project and facilitates user selection of past time periods likely to reflect future progress of the project. This provides easier and more accurate estimation of completion dates and time durations for individual tasks of a project and for the entire project.

For example, in one embodiment, a project scheduling tool is configured to calculate a percentage time deviation, between a more accurate, updated time duration and a planned time duration, for each present activity of a project to form a plurality of percentage time deviations. An arithmetic mean of the plurality of percentage time deviations is calculated and a time duration of at least one future activity of the project, that is related to each present activity, is transformed based on the arithmetic mean.

In one embodiment, data is represented in terms of at least one computer-implemented data structure. A data structure can be transformed within a computing system by transforming the data within the data structure, transforming the structure of the data structure, or both.

FIG. 1 illustrates one embodiment of a computer system 100, having a computing device 105 configured with a project scheduling tool 110. For example, in one embodiment, the project scheduling tool 110 may be part of a project planning computer application of a company, configured to facilitate the scheduling and updating of multiple activities of a project plan. In accordance with one embodiment, a graphical user interface is provided by the project planning computer application (e.g., by a visual user interface logic of the project scheduling tool 110). In one embodiment, the project planning computer application may comprise construction management software that computerizes the process for constructing a building or other object. In one embodiment, the software and computing device 105 may be configured to operate with or be implemented as a cloud-based networking system, a software-as-a-service (SaaS) architecture, or other type of computing solution.

With reference to FIG. 1, in one embodiment, the project scheduling tool 110 is implemented on the computing device 105 and includes logics for implementing various functional aspects of the project scheduling tool 110. In one embodiment, the project scheduling tool 110 includes a schedule forecasting logic 115, a schedule roll-up logic 120, and a visual user interface logic 125 which are operably connected to each other within the project scheduling tool 110.

However, other embodiments may provide different logics or combinations of logics that provide the same or similar functionality as the project scheduling tool 110 of FIG. 1. In one embodiment, the project scheduling tool 110 is an executable application including algorithms and/or program modules configured to perform the functions of the logics. The application is stored in a non-transitory medium.

The computer system 100 also includes a display screen 130 operably connected to the computing device 105. In accordance with one embodiment, the display screen 130 is used to display views of and facilitate user interaction with a graphical user interface (GUI) provided by the visual user interface logic 125 for project scheduling. In one embodiment, the project scheduling tool 110 is a centralized server-side application that is accessed by many users. Thus the display screen 130 may represent multiple computing devices/terminals that allow users to access and receive services from the project scheduling tool 110 via networked computer communications.

In one embodiment, the computer system 100 further includes at least one database device 140 operably connected to the computing device 105 or a network interface to access the database device 140 via a network connection. In accordance with one embodiment, the database device 140 is configured to store and manage data structures (e.g., records of activities and resources) associated with the project scheduling tool 110 in a database system (e.g., a program plan computer application).

Referring back to the logics of the project scheduling tool 110 of FIG. 1, in one embodiment, the visual user interface logic 125 is configured to provide a graphical user interface (GUI) associated with a project planning computer application. For example, the visual user interface logic 125 includes program code that generates and causes the graphical user interface to be displayed based on an implemented graphical design of the interface. In response to user actions and selections via the GUI, associated aspects of activities of a project plan may be edited and updated In one embodiment, the visual user interface logic 125 is also configured to generate a graph representing a project or an activity in terms of project units versus time. The project units may include, for example, one of man-hours, miles-of-track, cubic feet, or cubic meters. Many other types of project units are possible as well, in accordance with other embodiments.

The graph is based on an actual project (or activity) data structure, specifying an actual progress of the project (or activity), and a planned progress data structure, specifying a planned progress of the project (or activity). The planned progress of the project (or activity) includes a first (initial or baseline) forecasted completion date for the project (or activity). Examples of such graphs are illustrated and discussed herein with respect to FIGS. 2-8.

The visual user interface logic 125 is configured to facilitate user editing of at least one of the actual progress data structure and the planned progress data structure via the graphical user interface. For example, as the project (or activity) progresses, a user (e.g., a project manager) may enter recent actual progress data into the actual progress data structure. Furthermore, at the beginning of the project (or activity), a user may enter planned progress data into the planned progress data structure.

The visual user interface logic 125 is further configured to facilitate user placement of a trend start indicium and a trend finish indicium, on the display screen 130 via the graphical user interface, with respect to a representation of the actual progress on the graph. A user may select the placement of the indicia based on, for example, having the perception that the trend of actual progress between the indicia is a good representation of expected future progress. Examples of the placement of such indicia are illustrated and discussed herein with respect to FIGS. 2-8.

In one embodiment, the visual user interface logic 125 is configured to facilitate user placement of check point indicia, via the graphical user interface, with respect to the representation of the actual progress on the graph. The visual user interface logic 125 is also configured to generate check point data structures associated with the check point indicia and facilitate entry of user comment data, via the graphical user interface, into the check point data structures. The visual user interface logic 125 is further configured to facilitate recalling of the user comment data, via the graphical user interface, from the check point data structures and facilitate displaying of the user comment data on the display screen 130. An example of such checkpoints is illustrated and discussed herein with respect to FIG. 3.

The schedule forecasting logic 115 is configured to generate the planned progress data structure having planned progress data characterizing a planned progress of the project (or activity). The schedule forecasting logic 115 is also configured to generate the actual progress data structure having actual progress data characterizing an actual progress of the project (or activity). The schedule forecasting logic 115 is further configured to generate a slope value corresponding to a slope of a linear path between the trend start indicium and the trend finish indicium on the graph. The slope value represents a pace or velocity of actual progress of the project (or activity) between the two indicia.

The schedule forecasting logic 115 is configured to extrapolate the actual progress data within the actual progress data structure (i.e., transform the actual progress data structure), based on the slope value, from a current time to a future time. The future time corresponds to a second (updated or forecasted) completion date for a project (or activity). In this manner, a more accurate or realistic project (or activity) completion date may be forecasted based on a pace or velocity of actual progress data. Examples of such extrapolations are illustrated and discussed herein with respect to FIGS. 2-8.

In accordance with one embodiment, a project may include multiple activities organized across multiple categories of the project. For example, a project may include a plumbing category having plumbing activities, an electrical category having electrical activities, and a concrete category having concrete activities. The activities and categories may be related to each other in time. For example, one activity may not be able to be started until another activity is completed. Likewise, one category of activities may not be able to be started until another category of activities is completed.

Furthermore, activities and categories may be related to each other by one or more resources. For example, two activities may be scheduled to use the same resource to perform the two activities. Therefore, the two activities may have to be staggered in time to ensure that the resource is available for both activities.

The schedule roll-up logic 120 is configured to roll up time durations and completion dates for multiple activities across multiple categories of a project based on relationship constraints. Once time durations and completion dates for individual activities of a project have been updated by the schedule forecasting logic 115, the schedule roll-up logic 120 inputs information including the time durations, completion dates, and relationships with respect to time and resources. The schedule roll-up logic 120 operates on the input information to position the activities of the various categories of the project in time with respect to each other and to generate a forecast completion date for the project. An example of rolling up activities of a project is discussed later herein with respect to FIGS. 11-12.

FIGS. 2A-2D illustrate various example embodiments of project progress graphs showing how the project scheduling tool 110 of FIG. 1 facilitates determining a more accurate completion date for a project. The project scheduling tool 110 allows a user to select a period of time that best represents the underlying trend (i.e., the conditions most likely to prevail in the remaining duration of a project). Along a plotted line of actual progress, two indicia may be provided denoting the start and finish of the representative period (representative trend region), respectively. In one embodiment, the visual user interface logic 125 is configured to generate project progress graphs through operable interaction with the schedule forecasting logic 115.

Figure 2A:
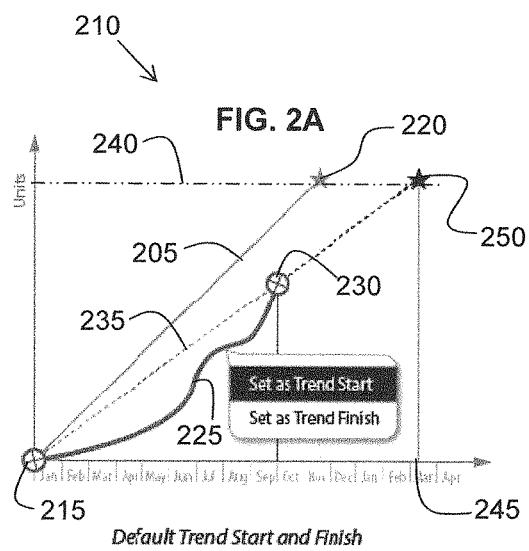
FIGS. 2A-2D illustrate various example embodiments of project progress graphs showing how the project scheduling tool of FIG. 1 facilitates determining a more accurate completion date for a project.

Referring to FIG. 2A, a line 205, representing a planned progress of a project, is shown on a graph 210 of time versus project units for the project. The line 205 has a planned start point 215 (e.g., corresponding to a start date) for the project and a planned completion point 220 (e.g., corresponding to a completion date) for the project. The graph 210 also has a plotted line (curved line) of actual progress 225 representing the actual progress of the project up to a current point 230 corresponding to a current date.

In one embodiment, a user may drag a trend start indicium to any point on the curve of actual progress 225 and set that point as the start of the representative period. Alternatively, the user may right-click on the same point and select a "Set as Trend Start" option from a displayed menu. Similarly, the user may select any point on the curve of actual progress 225 that lies to the right of the trend start indicium to position or set a trend finish indicium.

Referring to FIG. 2A, a user may place a trend start indicium at the planned start point 215 on the line of actual progress 225 and a trend finish indicium at the current point 230 on the line of actual progress 225. In FIG. 2A, the indicia are graphically represented by a circled X. The slope of the line of actual progress 225, between the two indicium, represents the actual velocity or pace of work on the project. This velocity can fluctuate, depending on the actual ground realities faced while executing the project. Variance from the planned velocity can occur due to one-off events, or because of recurring (but unforeseen) events.

In one embodiment, a user may enter specific dates rather than infer the representative period from the slope of the line of actual progress by selecting two points on the horizontal time axis using a similar right-click menu. The user may also manually edit the start and end dates of the representative period that appear below the graph. In one embodiment, the default positions of the trend start indicium and the trend finish indicium are the first and last points, 215 and 230, on the line of actual progress 225, respectively. In other words, by default, the tool 110 considers the future velocity of work to be the average velocity of the work performed to date.

Referring to FIG. 2A, in one embodiment, the tool 110 connects the positions on the graph of the two indicia by a straight line 235 and extends the straight line 235 to the right, at a slope, until the straight line 235 intersects an (imaginary) horizontal line 240 denoting the total number of project units for the project. The x-coordinate 245, corresponding the right-most point 250 of the extended straight line 235, corresponds to the forecasted completion date of the entire project. The slope of the straight line 235 determines where the forecasted completion date will fall on the graph 210.

Figure 2B:
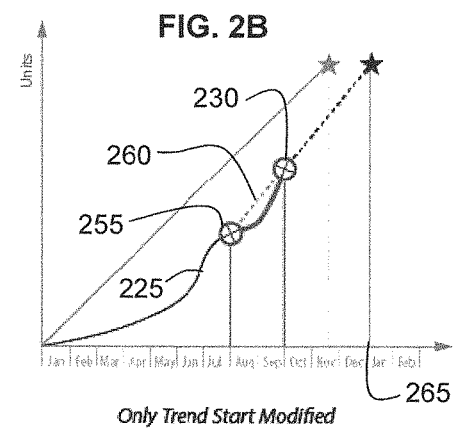

FIG. 2B is similar to FIG. 2A, except that the trend start indicium is at a different position 255 on the line of actual progress 225. In this manner, the different slope of the straight line 260 between the trend start indicium and the trend finish indicium results in a different forecasted completion date 265 for the project.

Figure 2C:
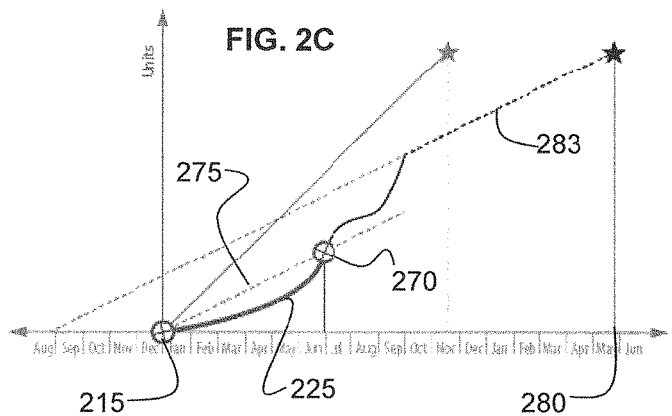

FIG. 2C is similar to FIG. 2A, except that the trend finish indicium is at a different position 270 on the line of actual progress 225. In this manner, the different slope of the straight line 275 between the trend start indicium and the trend finish indicium results in a different forecasted completion date 280 for the project. Note that, as in FIG. 2A and FIG. 2B, a straight line 283 is extended from the last point on the line of actual progress 225 at the slope of the straight line 275. In FIG. 2A and FIG. 2B the extended straight line is co-linear with the straight line between the trend indicia. However, in FIG. 2C, since the position of the trend finish indicium does not coincide with the last point on the line of actual progress 225, the extended straight line 283 is parallel to the straight line 275, but not co-linear.

Figure 2D:
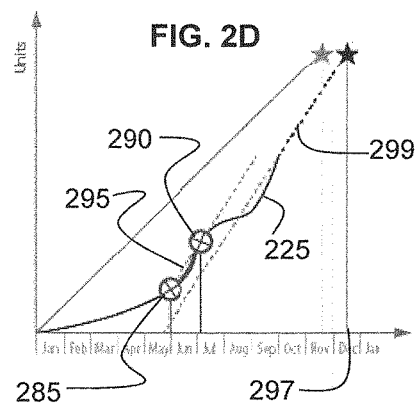

FIG. 2D is similar to FIG. 2A, except that both the trend start indicium and the trend finish indicium are at different positions 285 and 290, respectively, on the line of actual progress 225. In this manner, the different slope of the straight line 295 between the trend start indicium and the trend finish indicium results in a different forecasted completion date 297 for the project. Note that, as in FIG. 2A and FIG. 2B, a straight line 299 is extended from the last point on the line of actual progress 225 at the slope of the straight line 295. In FIG. 2A and FIG. 2B the extended straight line is co-linear with the straight line between the trend indicia. However, in FIG. 2C, since the positions of the trend start indicium and the trend finish indicium do not coincide with the first and last points, respectively, on the line of actual progress 225, the extended straight line 299 is parallel to the straight line 295, but not co-linear.

In this manner, the completion date of a project can be updated to more accurately reflect actual progress of the project. The user has discretion with respect to selecting a representative trend region from the actual progress. The project scheduling tool 110 is configured to extend the line of actual progress from the last point of the actual data (e.g., today's date) to an updated projection completion point at a rate corresponding to the slope of the straight line between trend points bounding the representative trend region.

As discussed above with respect to FIG. 1, in one embodiment, the schedule forecasting logic 115 is configured to facilitate updating the completion date of a project to more accurately reflect actual progress of the project. The techniques discussed herein with respect to FIGS. 2A-2B may also be applied to an individual activity of a project, in accordance with one embodiment.

Figure 3:
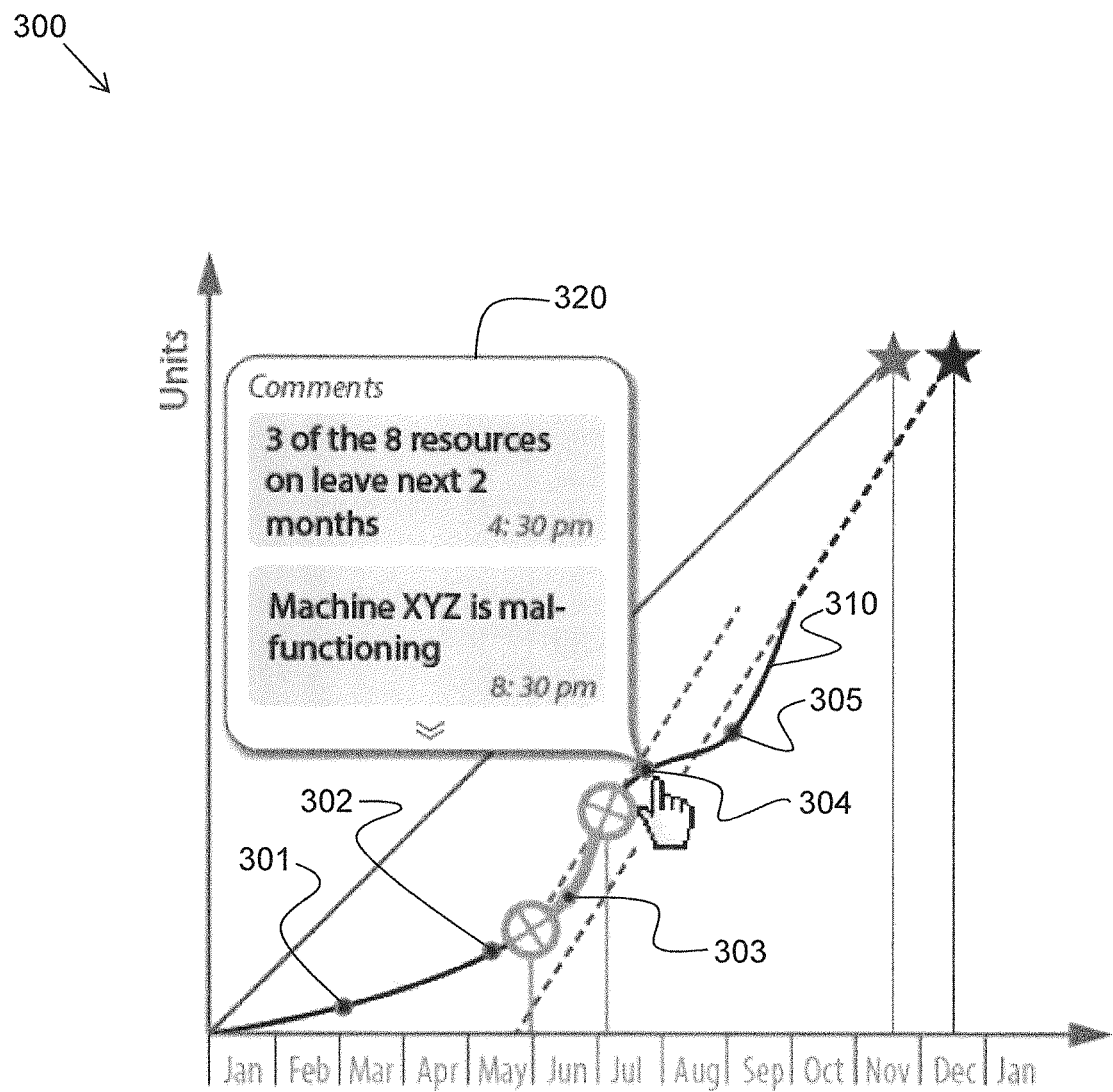
FIG. 3 illustrates one example embodiment of a project progress graph showing how the project scheduling tool of FIG. 1 facilitates the defining of check points and the entering of associated comments with respect to a project.

FIG. 3 illustrates one example embodiment of a project progress graph 300 showing how the project scheduling tool 110 of FIG. 1 facilitates the defining of check points and the entering of associated comments with respect to a project. There are often planned and unplanned aberrations in the course of a project due to changes in certain factors during the project execution phase. Such changes can include, for example, a change in conditions (e.g., a change in terrain while laying a railway track), replacement of resources assigned to the project (e.g., shifting to newer machinery), or unplanned holidays taken by labor resources.

The project scheduling tool 110 is configured to keep track of the dates on which such impactful changes have been recorded and highlights the corresponding check points 301-305 on the line of actual progress 310 (as shown in FIG. 3). Before attempting to forecast the project, as discussed previously herein, a project manager may view the check point details (e.g., comments 320) by hovering on the respective check point indicia and, therefore, make a better informed forecast (e.g., select a better representative trend region). As discussed above with respect to FIG. 1, in one embodiment, the visual user interface logic 125 is configured to facilitate user interaction with the graphical user interface to manipulate check point information.

Figure 4:
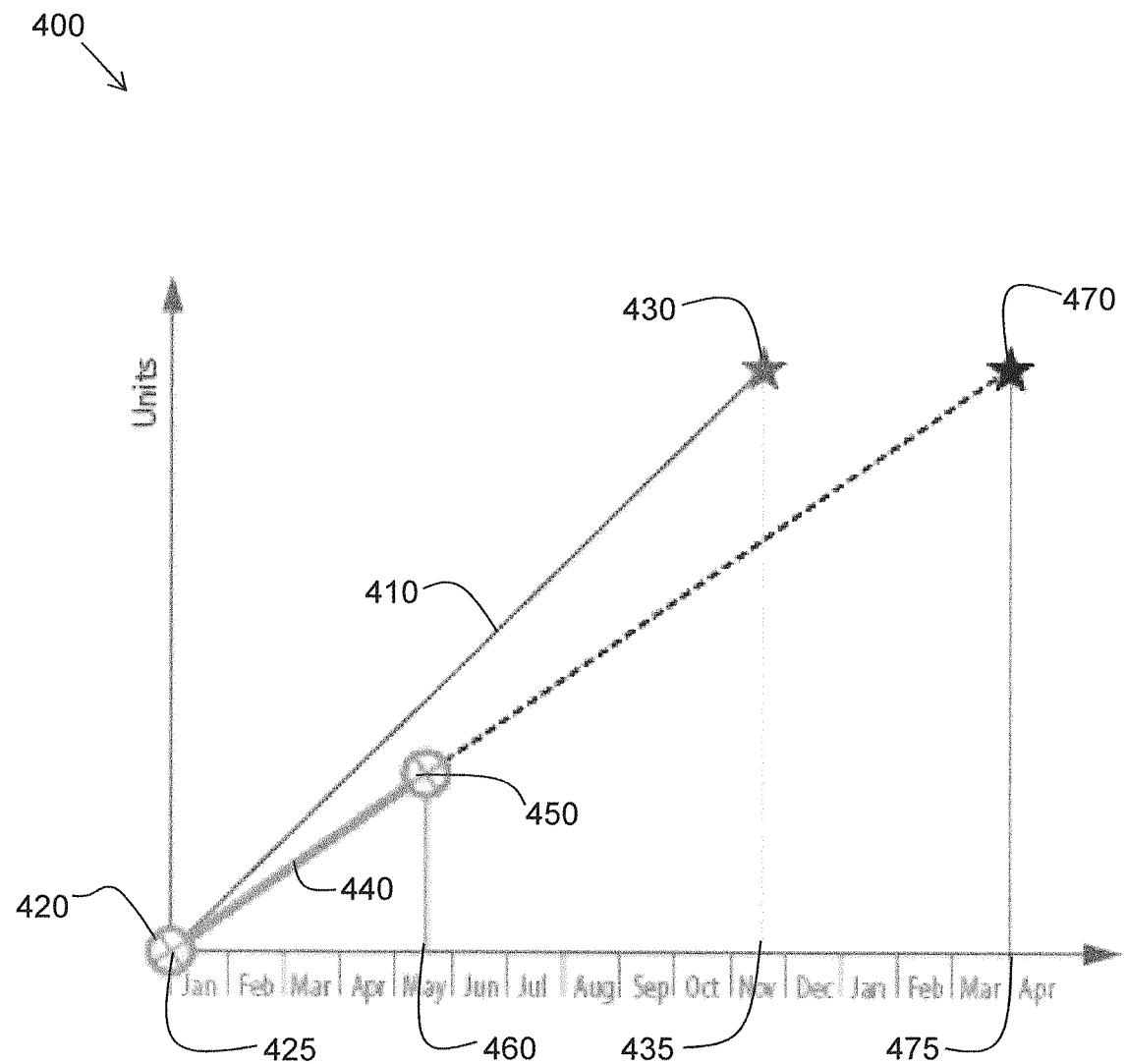
FIG. 4 illustrates a first example embodiment of a project progress graph, provided by the project scheduling tool of FIG. 1, for a project to connect two cities by railway track.

FIG. 4 illustrates a first example embodiment of a project progress graph 400, provided by the project scheduling tool 110 of FIG. 1, for a project to connect two cities by railway track. FIG. 4 shows a line 410, representing a planned progress of a project, on a graph 400 of time versus project units for the project. The line 410 has a planned start point 420 (e.g., corresponding to a start date 425) for the project and a planned completion point 430 (e.g., corresponding to a planned completion date 435) for the project. The graph 400 also has a plotted line 440 of actual progress representing the actual progress of the project up to a current point 450 corresponding to a current date 460.

With respect to the project of FIG. 4, it can be seen that the actual progress of the project is lagging behind the planned progress of the project. The lagging behind may prompt a project manager to investigate the cause of the slow pace of work. For example, the project manager may discover that tough and undulating terrain is the cause of the delay.

In response, the project manager can use the project scheduling tool 110 to select a representative time interval starting from the start point 420 of the project and going to the current date 460 as discussed earlier herein. The schedule forecasting logic 115 can extrapolate the line of actual progress 440 to a forecast completion point 470, using the techniques discussed earlier herein, to determine a more realistic completion date 475 for the project.

Figure 5:
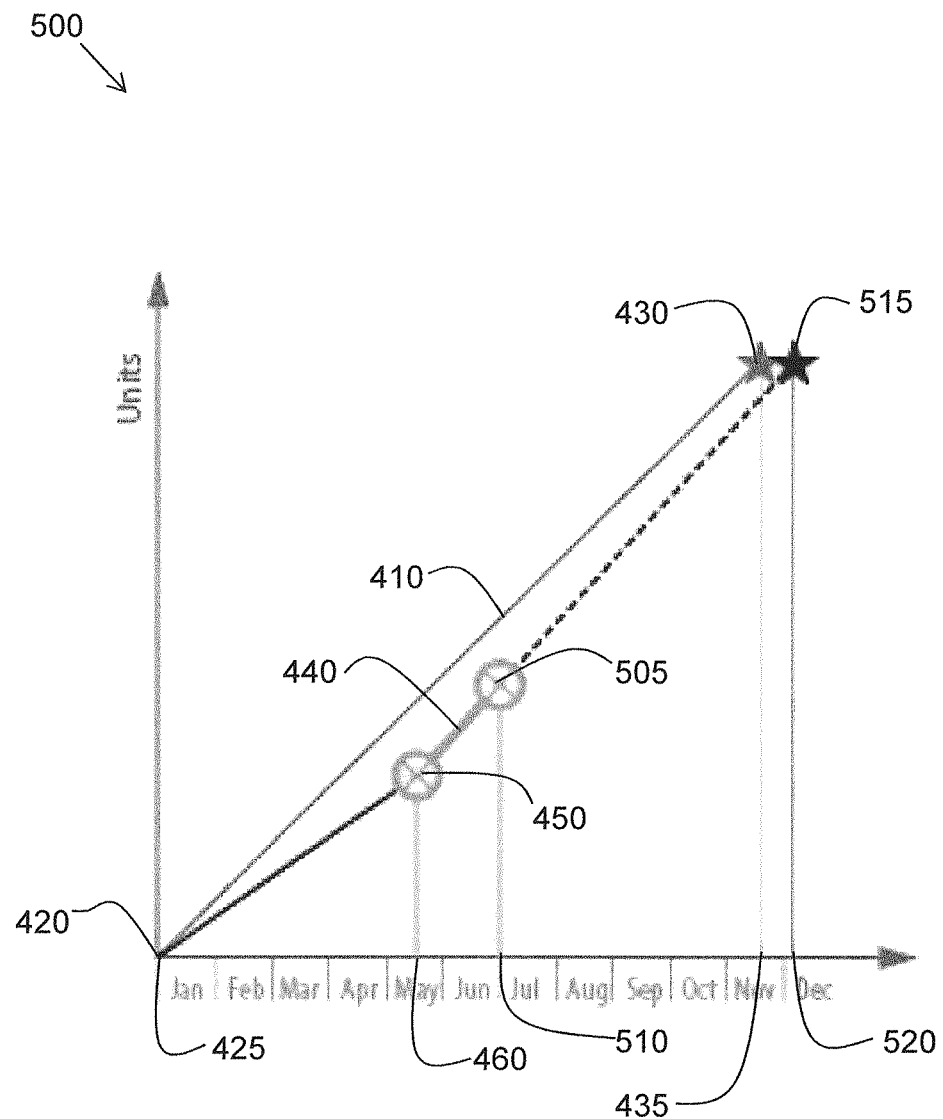
FIG. 5 illustrates a second example embodiment of a project progress graph, provided by the project scheduling tool of FIG. 1, for a project to connect two cities by railway track.

FIG. 5 illustrates a second example embodiment of a project progress graph 500, provided by the project scheduling tool 110 of FIG. 1, for a project to connect two cities by railway track. The graph 500 is similar to the graph 400 of FIG. 4. However, in the example of FIG. 5, instead of simply accepting the delay due to the tough and undulating terrain, the project manager has decided to try to more closely meet the original planned completion date of the project. As such, the project manager has decided to procure new equipment specifically built for use in undulating terrain.

As can be seen in FIG. 5, as the pace of work increases with the use of the new equipment, the line of actual progress 440 slopes more steeply upwards from point 450 to point 505. The project manager can arrive at an accurate estimate for project completion by having the tool 110 extend the actual line of progress 440, based on the use of the new equipment from point 450 at time 460 to point 455 at the current time 510, to a newly projected completion point 515. As can be seen in FIG. 5, the projected date of completion of the project 520 is much closer to the original planned date of completion 435 than in FIG. 4.

Figure 6:
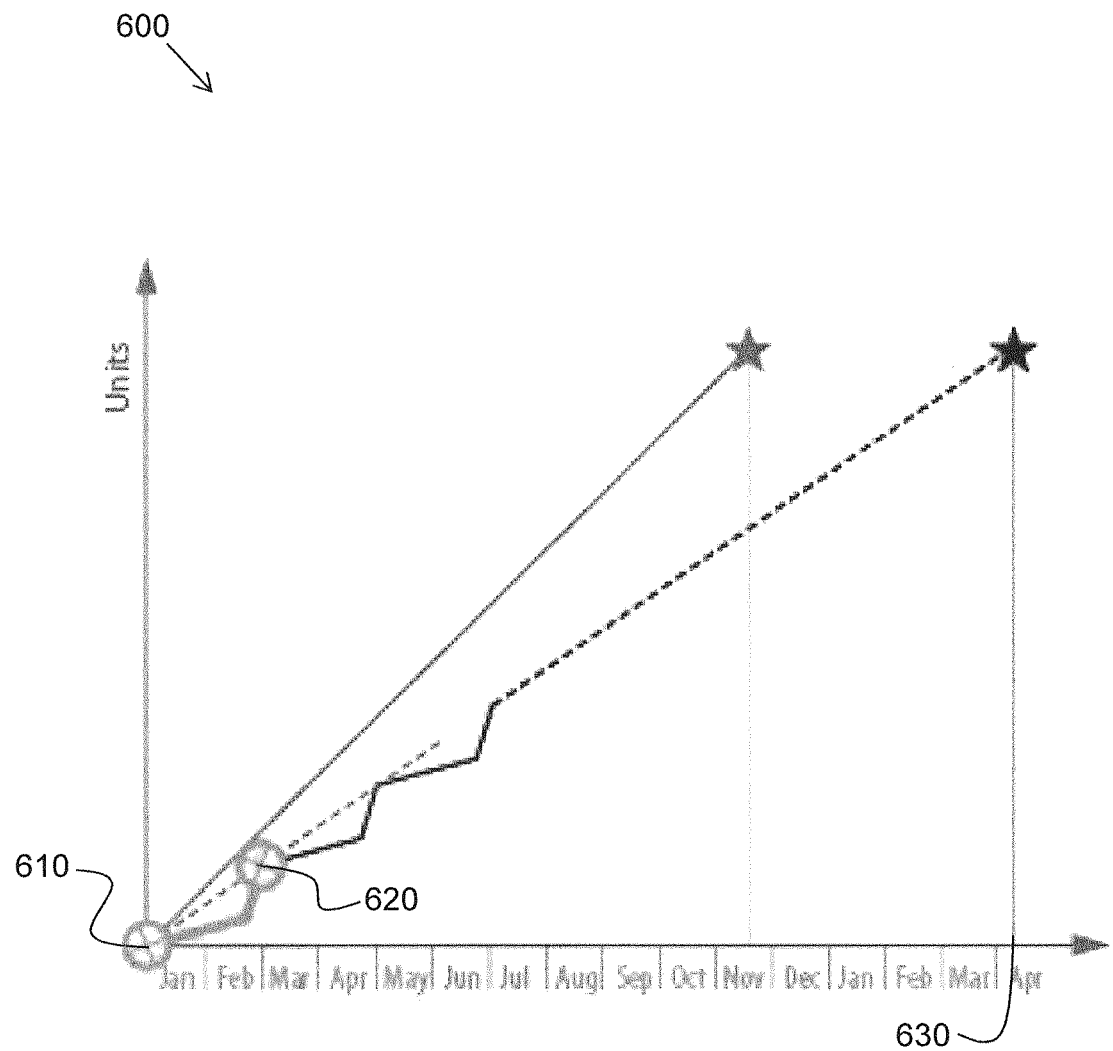
FIG. 6 illustrates a third example embodiment of a project progress graph, provided by the project scheduling tool of FIG. 1, for a project to connect two cities by railway track.

FIG. 6 illustrates a third example embodiment of a project progress graph 600, provided by the project scheduling tool 110 of FIG. 1, for a project to connect two cities by railway track. In this example, local labor is hired and used for the project. Therefore, as laying of the railway track proceeds, new laborers are hired to replace the earlier ones. For example, the churn of laborers may occur every 100 miles.

The productivity of new laborers is lower initially while they acclimate to the project. For example, the pace of work for the new laborers may reach the planned pace after they complete laying thirty (30) miles of track. To get an accurate estimate of the overall duration of the project, the project manager can consider the average pace over one or more hiring cycles.

As seen in FIG. 6, the project manager has selected two points (a trend start point 610 and a trend finish point 620) along the line of actual progress that correspond to the start and finish of a hiring cycle. Using the techniques previously described herein, the project scheduling tool 110 determines an accurate projection for the completion date 630 of the project.

Figure 7:
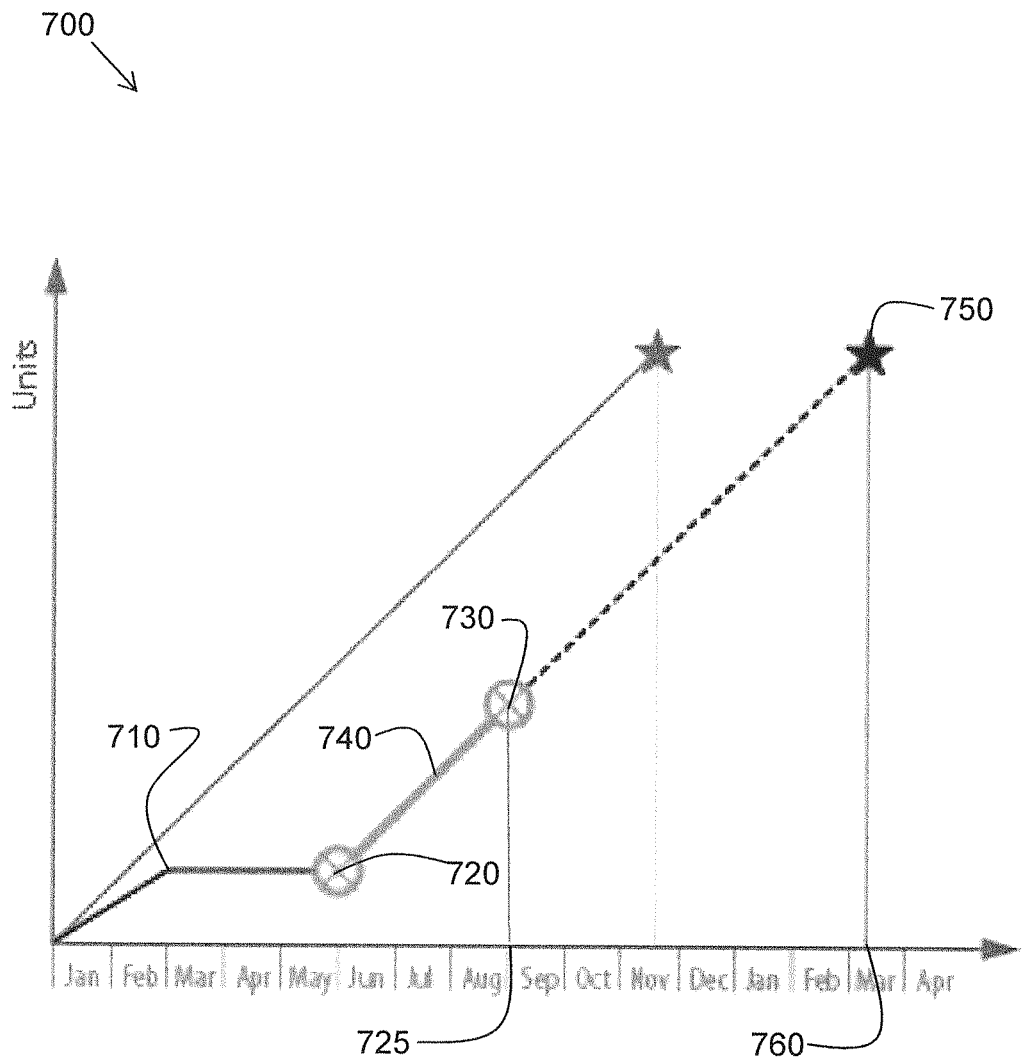
FIG. 7 illustrates a fourth example embodiment of a project progress graph, provided by the project scheduling tool of FIG. 1, for a project to connect two cities by railway track.

FIG. 7 illustrates a fourth example embodiment of a project progress graph 700, provided by the project scheduling tool 110 of FIG. 1, for a project to connect two cities by railway track. In this example, work on the railway stops after a while at point 710 due to a labor dispute. After the dispute gets resolved at point 720, the work proceeds at roughly the originally planned pace.

As seen in FIG. 7, a project manager may select a representative trend region of actual progress starting from the resumption of work at point 720 and extending to the current date 725 corresponding to point 730. Using the techniques described herein, the project scheduling tool 110 extends the actual line of progress 740 after the resumption of work to point 750. The point 750 corresponds to a newly projected completion date 760 for the project which takes into account the delay due to the work stoppage.

Figure 8:
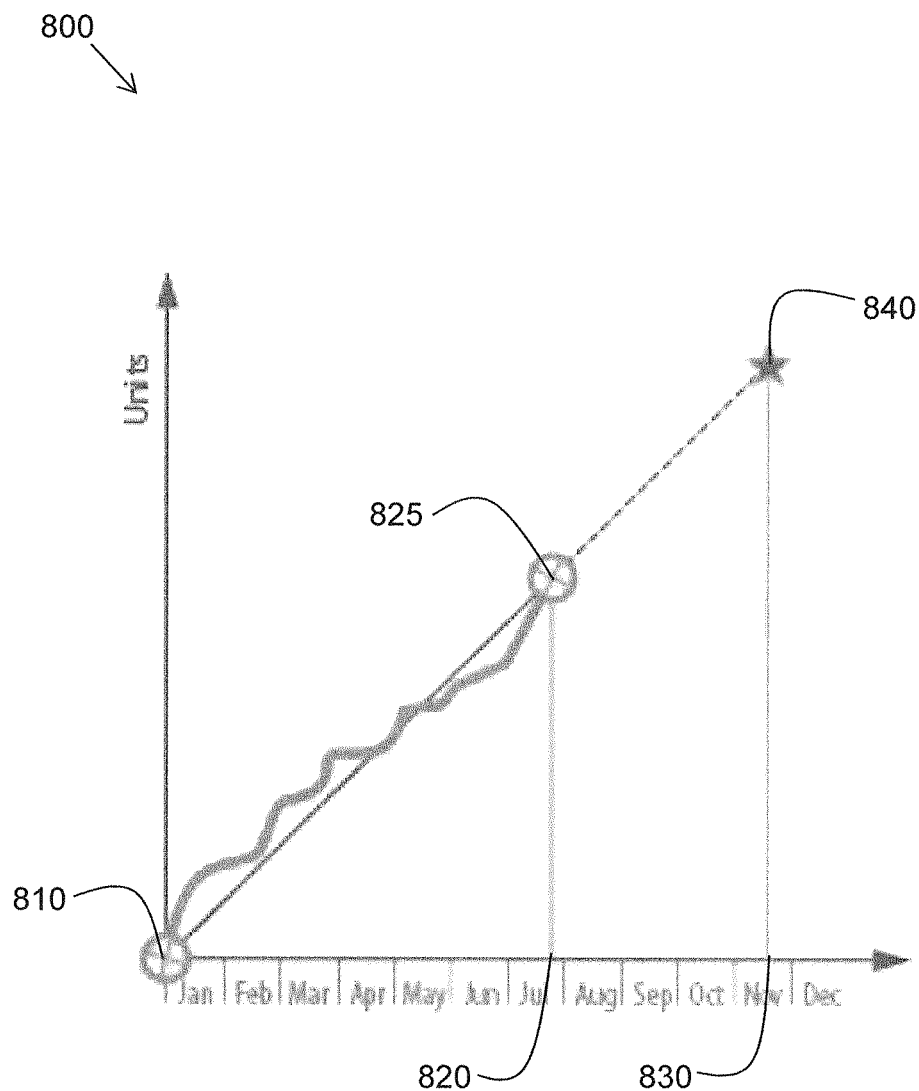
FIG. 8 illustrates a fifth example embodiment of a project progress graph, provided by the project scheduling tool of FIG. 1, for a project to connect two cities by railway track.

FIG. 8 illustrates a fifth example embodiment of a project progress graph 800, provided by the project scheduling tool 110 of FIG. 1, for a project to connect two cities by railway track. In the real world, as a project progresses, some days are more productive than others, even when the overall pace is in line with the plan. To accommodate such a reality, a project manager may select the entire period from the start of the project at point 810 to the current date 820 corresponding to point 825 as the representative trend region as shown in the example of FIG. 8. As such, the day-to-day variations of productivity are effectively ignored or filtered out, and an accurate completion date 830 may be forecast, as shown in FIG. 8, corresponding to point 840.

Complex projects frequently comprise activities that are very dissimilar to each other. In such projects, it would likely be a mistake to assume that delays or schedule deviations in one kind of activity would portend delays in tasks of a different nature. An example of different activity categories (e.g., for a hotel construction project) may include design, external construction, electrical work, plumbing, and furnishing. In one embodiment, an activity code may be assigned to each activity to indicate a category to which the activity belongs. It may be likely, however, that schedule deviations in an activity belonging to one category may foreshadow similar deviations in other activities in the same category.

In accordance with one embodiment, a project manager may view a graph for each on-going activity, instead of just a graph for the overall project. The project manager may use the project scheduling tool 110 to generate projections for each activity in a similar manner to that described previously herein with respect to an overall project. The project scheduling tool 110 may provide the project manager with the choice to use the generated projections for other activities in the same category, activities helmed by the same resource, or both.

Forecasted dates for future activities may be determined by applying the same percentage deviation of duration as seen in the projections. In addition to the projections for on-going activities, the actual duration of completed activities may also inform the projected duration of future activities. Where there is more than one activity of a type that is completed or is in progress, the projected duration of future activities may differ from their planned durations by the arithmetic mean of the percentage deviations in the durations of the completed and on-going activities. The computation and application of such an arithmetic mean is discussed later herein with respect to FIG. 10.

Figure 9:
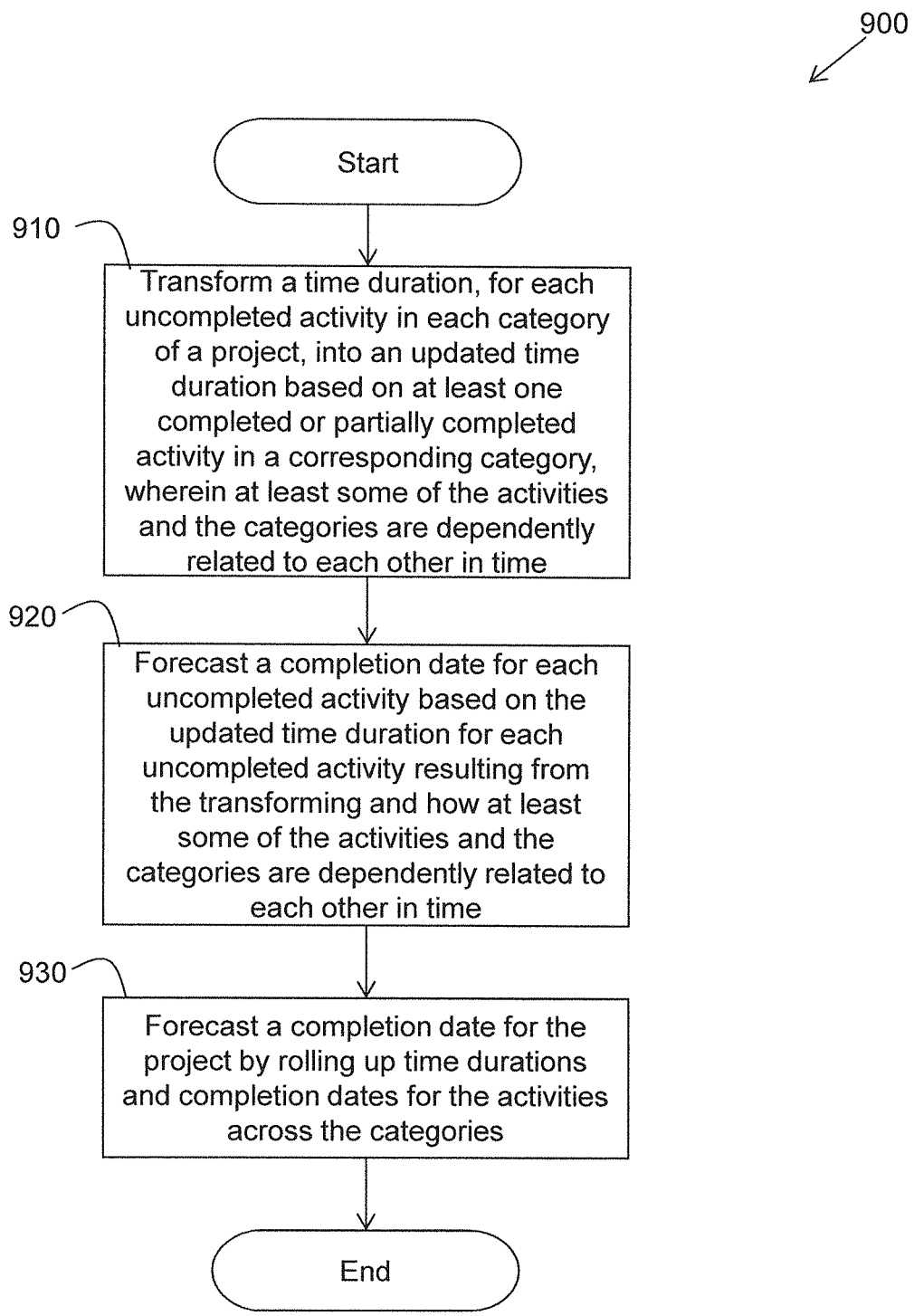
FIG. 9 illustrates one embodiment of a method performed by the project scheduling tool of the computer system of FIG. 1, for aiding a project manager to obtain an accurate view of progress of a project, both past and projected.

FIG. 9 illustrates one embodiment of a computer-implemented method 900 performed by the project scheduling tool 110 of the computer system 100 of FIG. 1, for aiding a project manager to obtain an accurate view of progress of a project, both past and projected. Method 900 is implemented to be performed by the project scheduling tool 110 of FIG. 1, or by a computing device configured with an algorithm of the method 900.

Method 900 will be described from the perspective that a complex project has many activities that are categorized into various categories. At least some of the activities and categories are dependently related to each other in time. Furthermore, some of the activities and categories may rely on using some of the same resources.

Upon initiating method 900, at block 910, a time duration for each uncompleted activity in each category of a project is transformed into an updated time duration. The transformation for each activity is based on at least one completed or partially completed activity in a corresponding category. The assumption is that activities in a same category are similar in nature and are likely to progress at a similar rate. In one embodiment, the schedule forecasting logic 115 is configured to transform the time durations.

Again, at least some of the activities and categories are dependently related to each other in time. Examples of categories for a project may include plumbing work, electrical work, and concrete work. Examples of plumbing activities may include: install underground water lines, install bathroom fixtures, and connect taps to water lines.

At block 920, a completion date is forecasted for each uncompleted activity for each category. The forecast is based on the updated time duration for each uncompleted activity and how at least some of the activities and categories are dependently related to each other in time. In one embodiment, the schedule forecasting logic 115 is configured to forecast the completion dates. At block 930, a completion date for the entire project is forecasted by rolling up time durations and completion dates for all of the activities of the project (whether completed or not) across all of the categories of the project. In one embodiment, the schedule roll-up logic 120 is configured to determine a completion date for the entire project.

In one embodiment, at least one data structure having data representative of the project may be transformed based on the completion date for the project and the completion date for each uncompleted activity. The completion date may be presented on the display screen 130 to a user. Other information within the data structure may be displayed as well.

In one embodiment transforming a time duration for an uncompleted activity may be accomplished by specifying a trend start point and a trend finish point with respect to actual progress data. The actual progress data is in project units versus time and is associated with at least one completed or partially completed activity in a same category as the uncompleted activity. Examples of project units include man-hours, miles-of-road, cubic feet, or cubic meters.

A slope value is generated, in project units per unit time. The slope value corresponds to a slope of a linear path between the trend start point and the trend finish point of the actual progress data associated with the completed or partially completed activity. A baseline end time of the time duration for the uncompleted activity is adjusted by extrapolating from the baseline end time to an adjusted end time based on the slope value. The updated time duration of the uncompleted activity corresponds to the time between the start of the uncompleted activity and the adjusted end time of the uncompleted activity.

In another embodiment, transforming a time duration for an uncompleted activity may be accomplished by calculating a percentage time deviation, between an actual time duration and a planned time duration, for at least one completed or partially completed activity in a same category as the uncompleted activity. The percentage time deviation is applied to the time duration for the uncompleted activity. In this manner, the time duration is transformed into an updated time duration. Applying the percentage time deviation to the time duration of an uncompleted activity may result in extending the time duration of the uncompleted activity. Alternatively, applying the percentage time deviation to the time duration of an uncompleted activity may result in compressing the time duration of the uncompleted activity.

In this manner, the time duration of an uncompleted activity is transformed. For example, the time duration of the uncompleted activity may be extended such that the adjusted end time occurs after the baseline end time. Alternatively, the time duration of the uncompleted activity may be compressed such that the adjusted end time occurs before the baseline end time. By relying on actual data from similarly related activities, accurate estimates of time durations for uncompleted activities may be determined and rolled up along with all other activities of a project to arrive at an accurate estimate for a project completion date.

In one embodiment, a first data structure, having data representing a plurality of present activities of a project that are related, is transformed. The first data structure is transformed by calculating a percentage time deviation between an updated time duration and a planned time duration for each of the plurality of present activities to form a plurality of percentage time deviation data within the first data structure. An arithmetic mean of the plurality of percentage time deviation data is calculated. A second data structure, having data representing at least one future activity of the project which is related to the plurality of present activities, is transformed. The second data structure is transformed by transforming a planned time duration of the future activity into an updated time duration of the future activity based on the arithmetic mean. The updated time duration of the future activity may be displayed on the display screen 130.

FIG. 10 illustrates one example embodiment of how the project scheduling tool 110 of FIG. 1 determines a representative rate of progress for activities of a project within a related project category using the method 900 of FIG. 9. FIG. 10 shows an activity table 1000 for a plumbing category of a project. Each row displayed in the activity table 1000 corresponds to either a completed activity or an on-going activity.

In one embodiment, each row in the table 1000 in preceded by a check box 1010 that is checked by default to indicate that the corresponding activity is to be included in a percentage time deviation calculation. If a project manager feels that a particular activity is an outlier or a fluke, and should not be included in the percentage time deviation calculation, the corresponding checkbox can be unchecked. After having unchecked all non-representative activities, the project manager may command the project scheduling tool 110 to proceed with the forecasting process.

Referring to FIG. 10, there are two (2) on-going plumbing activities and four (4) completed plumbing activities. Activity number 5 was taken up by a certain plumber who has not been keeping too well of late and has, therefore, been performing well below potential. Keeping this in mind, the project manager decides to uncheck (eliminate) activity 5, as the project manager deems activity 5 to be unrepresentative of the general trend of plumbing activities.

In this manner, the project scheduling tool 110 will take into account the projected or updated time duration, instead of the planned time duration, for an on-going or future activity that is related to other completed or on-going activities. Therefore, a completion date of the project generated through the scheduling process will reflect the insights gathered from the behavior of completed or on-going activities.

FIG. 10 clearly shows the planned time durations 1020 and the updated (actual or projected) time durations 1030 in units of days for each activity. In accordance with one embodiment, the project scheduling tool 110 calculates a percentage time deviation 1040 for each activity. The percentage time deviation corresponds to a percentage difference between an updated time duration and a planned time duration for each activity. The updated time durations for the two (2) on-going plumbing activities may be arrived at using the previous techniques discussed herein with respect to a project in FIGS. 2A-2D.

For example, a slope value, in terms of project units per unit time, may be generated corresponding to a slope of a linear path between a trend start point and a trend finish point over a user-selected portion of a completed time duration of an on-going activity. A remaining time duration of the on-going activity may be extrapolated, based on the slope value, from a current time to a future time corresponding to an updated completion date of the on-going activity. In this manner, the project scheduling tool 110 will take into account the more accurate or realistic updated time duration (completed time duration+remaining time duration), instead of the planned time duration, for the on-going activity.

In one embodiment, the project scheduling tool 110 is configured to calculate the arithmetic mean of the percentage time deviations of the checked activities. The arithmetic mean of the percentage time deviations of the checked activities in FIG. 10 is 4.5%. In this manner, the planned time duration of a future plumbing activity may be updated based on the arithmetic mean. For example, a future plumbing activity having a planned time duration of 7 days may be transformed such that its updated time duration is 7.315 days (i.e., 7 days×1.045).

Figure 11:
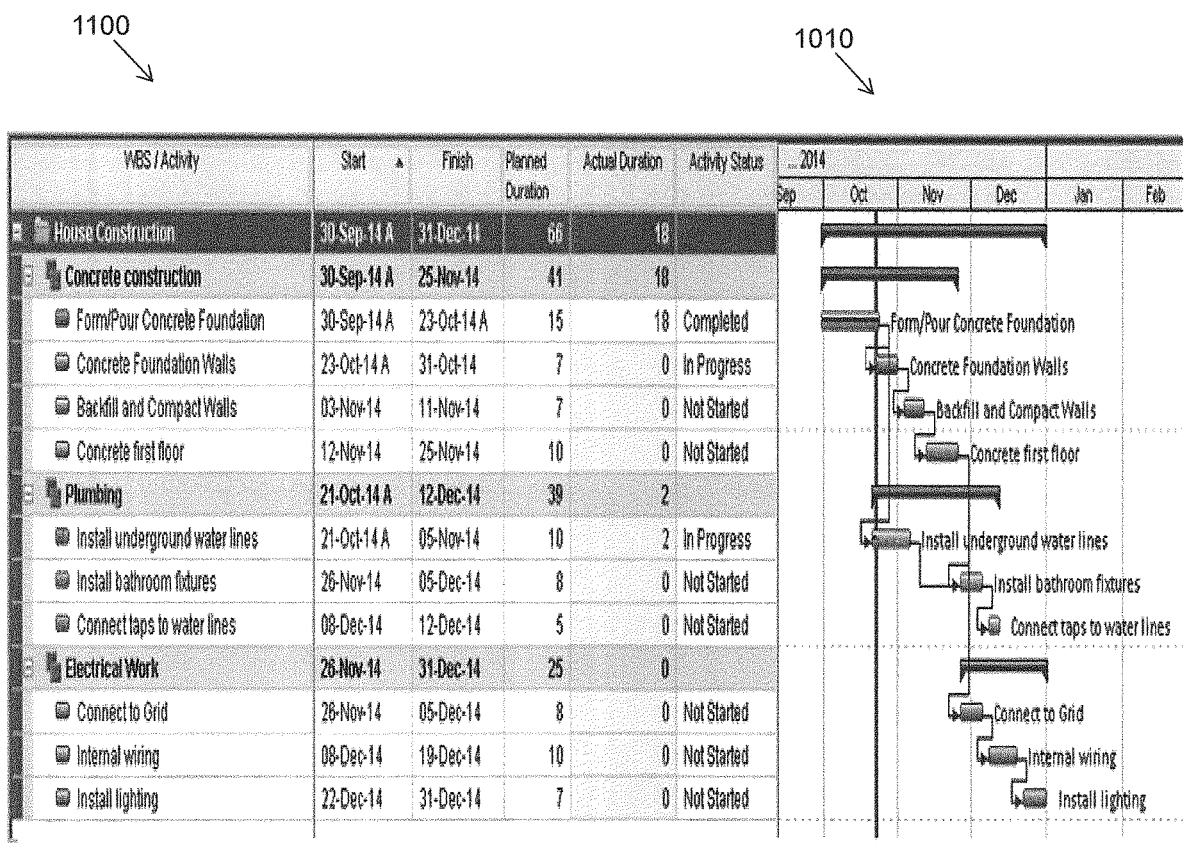

FIGS. 11-12 illustrate one example embodiment of how the project scheduling tool 110 of FIG. 1 forecasts a completion date for a project by rolling up activities across categories of the project using the method 900 of FIG. 9. FIG. 11 reflects a house construction project in tabular form. The table 1100 lists component activities to be performed to complete the house construction project, along with start and finish dates (actual or planned, depending on whether or not the activity has started). The adjoining Gantt chart 1110 illustrates the corresponding plots of the activities along the time axis, supplemented with connector arrows denoting the relationships between the various activities.

The activities in FIG. 11 have been categorized, based on their nature of work, in categories of concrete construction, plumbing construction, and electrical work. The first activity under the category of concrete construction is that of "form/pour concrete foundation", having a start date that coincides with the start date of the house construction project. Upon completion, the actual duration of the "form/pour concrete foundation" activity is 18 days, which happens to overshoot the planned duration of 15 days by 3 days.

In accordance with one embodiment, the rates at which the three remaining concrete construction activities proceed are extrapolated using the representative rate of the completed or on-going concrete construction activities. In this example, the "form/pour concrete foundation" activity is considered the default representative activity. The percentage time deviation for the "form/pour concrete foundation" activity is calculated as:

Percentage time deviation of "Form/Pour Concrete Foundation" =
$$\left[\left[\frac{(\text{Actual Duration} - \text{Planned Duration})}{\text{Planned Duration}}\right] \times 100\right]$$
$$\% = \left[\left[\frac{(18-15)}{15}\right] \times 100\right]\% = 20\%$$

Consequently, for a given future (not started) concrete construction activity, A:

Projected Duration$_{(A)}$=120% of Planned Duration$_{(A)}$

Similarly, for the second category of activities (plumbing), the "install underground water lines" activity is taken as a representative activity since it is the only plumbing activity that has started. The representative rate is taken as the rate at which the units of work have been completed so far. The "install underground water lines" activity is an immediate successor of the "form/pour concrete foundation" activity, but with a lag of negative 2 days. That is, the start date of the "install underground water lines" activity is offset to 2 days before the "form/pour concrete foundation" activity finishes (on October 23).

In the example of FIG. 11, it is assumed that the value of the planned labor units for the "install underground water lines" activity is 10 units and planned units per time is one (1) unit per day. Since the planned time duration is 10 days then, 2 days after the start of this activity, 2 units of work would be expected to be completed. However, due to an unexpectedly productive workforce of plumbers, 2.5 units of work are completed over the 2 days instead of just 2 units. The planned time to complete 2.5 units is 2.5 days. The percentage time deviation for the "install underground water lines" activity is calculated as:

Percentage time deviation of "Install Underground Water
Lines" = $\left[\left[\frac{(\text{Actual Duration} - \text{Planned Duration})}{\text{Planned Duration}}\right] \times 100\right]$
$$\% = \left[\left[\frac{(2-2.5)}{2}\right] \times 100\right]\% = -25\%$$

Consequently, for a given future (not started) or In-Progress plumbing activity, B:

Projected Duration$_{(B)}$=(1−25/100)×Planned Duration$_{(B)}$=75% of Planned Duration$_{(B)}$ For the third category of activities (electrical work), none of the activities have been started. Therefore, the representative rate for each of the activities is the same as their planned rates, and the percentage time deviation is 0%. Consequently, for any electrical work activity, C:

Projected Duration$_{(C)}$=Planned Duration$_{(C)}$

With durations of each of the uncompleted activities of the house construction project having been thus extrapolated, the schedule roll-up logic 120 of the project scheduling tool 110 may roll up the forecasts and dates, not just based on the relationships between activities, but also based on the newly updated (projected) durations as shown in the table 1200 of FIG. 12.

Referring to FIG. 12, the forecasted completion date 1210 of the house construction project is now offset to January 8, as opposed to the more optimistic date of December 31. The project manager may take up mitigation plans, if any, to attempt to make up for the delay of the overall project.

Systems, methods, and other embodiments for providing scheduling of activities of a project plan associated with a computer application have been described herein. In one embodiment, a project scheduling tool is configured to handle projects composed of activities that are largely similar in nature as well as more complex projects composed of activities that are widely dissimilar. The project scheduling tool takes into account project units (e.g., units of work) logged over elapsed periods of time of the project and facilitates user selection of past time periods likely to reflect future progress of the project. This provides easier and more accurate estimation of completion dates and time durations for individual tasks of a project and for the entire project.

Computing Device Embodiment

Figure 13:
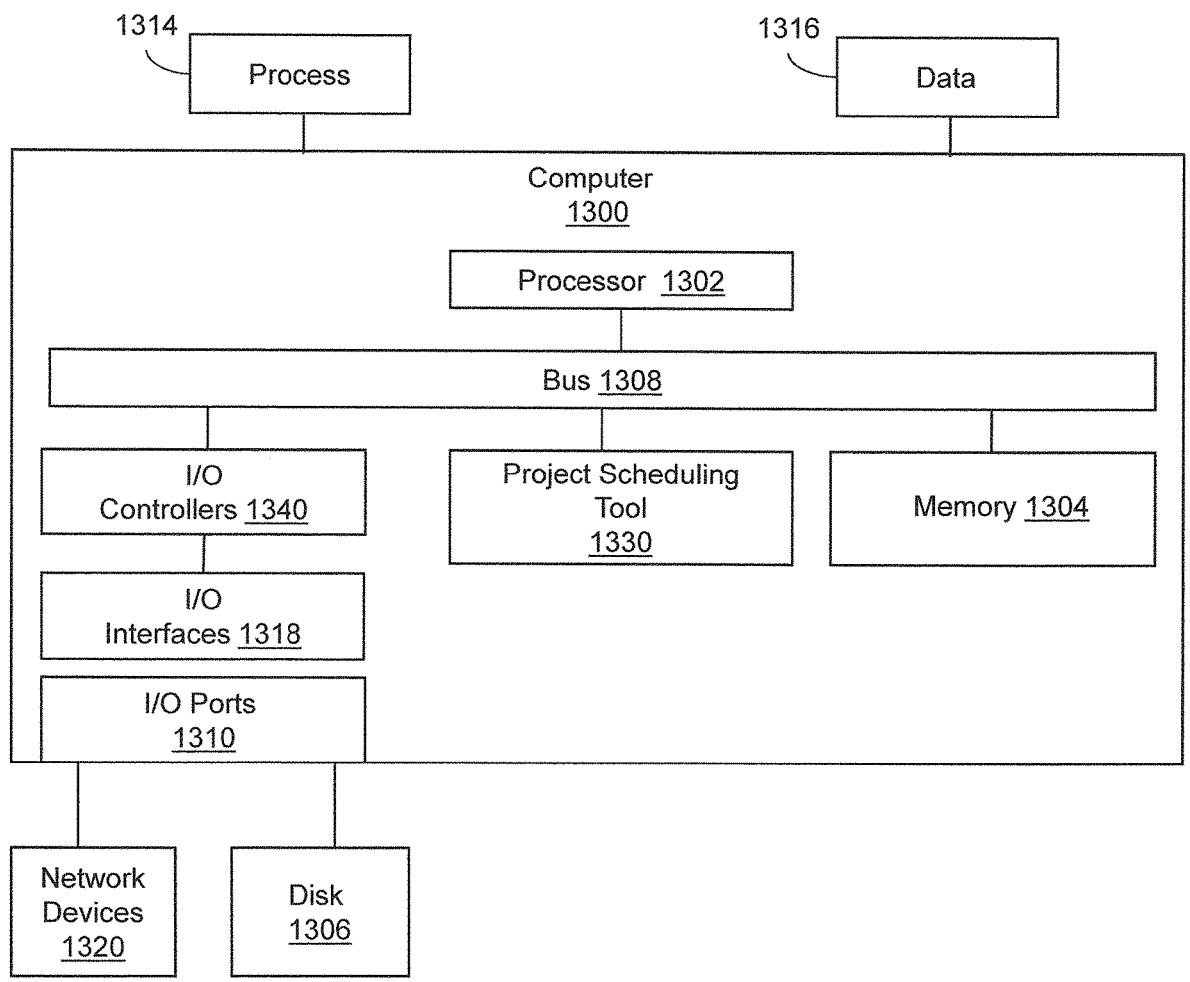
FIG. 13 illustrates one example embodiment of a computing device upon which the project scheduling tool of the computing system of FIG. 1 may be implemented.

FIG. 13 illustrates an example computing device that is configured and/or programmed with one or more of the example systems and methods described herein, and/or equivalents. FIG. 13 illustrates one example embodiment of a computing device upon which an embodiment of a project scheduling tool may be implemented. The example computing device may be a computer 1300 that includes a processor 1302, a memory 1304, and input/output ports 1310 operably connected by a bus 1308. In one example, the computer 1300 may include project scheduling tool 1330 configured to facilitate the forecasting of activity and project time durations and completion dates similar to project scheduling tool 110 shown in FIG. 1. In different examples, the tool 1330 may be implemented in hardware, a non-transitory computer-readable medium with stored instructions, firmware, and/or combinations thereof. While the tool 1330 is illustrated as a hardware component attached to the bus 1308, it is to be appreciated that in other embodiments, the tool 1330 could be implemented in the processor 1302, stored in memory 1304, or stored in disk 1306.

In one embodiment, tool 1330 or the computer 1300 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the management of activities and resources of a project plan. The means may also be implemented as stored computer executable instructions that are presented to computer 1300 as data 1316 that are temporarily stored in memory 1304 and then executed by processor 1302.

Tool 1330 may also provide means (e.g., hardware, non-transitory computer-readable medium that stores executable instructions, firmware) for facilitating the forecasting of activity and project time durations and completion dates.

Generally describing an example configuration of the computer 1300, the processor 1302 may be a variety of various processors including dual microprocessor and other multi-processor architectures. A memory 1304 may include volatile memory and/or non-volatile memory. Non-volatile memory may include, for example, ROM, PROM, and so on. Volatile memory may include, for example, RAM, SRAM, DRAM, and so on.

A storage disk 1306 may be operably connected to the computer 1300 via, for example, an input/output interface (e.g., card, device) 1318 and an input/output port 1310. The disk 1306 may be, for example, a magnetic disk drive, a solid state disk drive, a floppy disk drive, a tape drive, a Zip drive, a flash memory card, a memory stick, and so on. Furthermore, the disk 1306 may be a CD-ROM drive, a CD-R drive, a CD-RW drive, a DVD ROM, and so on. The memory 1304 can store a process 1314 and/or a data 1316, for example. The disk 1306 and/or the memory 1304 can store an operating system that controls and allocates resources of the computer 1300.

The computer 1300 may interact with input/output devices via the i/o interfaces 1318 and the input/output ports 1310. Input/output devices may be, for example, a keyboard, a microphone, a pointing and selection device, cameras, video cards, displays, the disk 1306, the network devices 1320, and so on. The input/output ports 1310 may include, for example, serial ports, parallel ports, and USB ports.

The computer 1300 can operate in a network environment and thus may be connected to the network devices 1320 via the i/o interfaces 1318, and/or the i/o ports 1310. Through the network devices 1320, the computer 1300 may interact with a network. Through the network, the computer 1300 may be logically connected to remote computers. Networks with which the computer 1300 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

"User", as used herein, includes but is not limited to one or more persons, computers or other devices, or combinations of these.

"Operable interaction", as used herein, refers to the logical or communicative cooperation between two or more logics via an operable connection to accomplish a function.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method performed by a computing system including at least a processor, a memory, and a display screen, wherein the computing system executes at least a project scheduling computer application for performing the method, the method comprising:

analyzing, by at least the processor, data representing a project and determining each uncompleted activity of a plurality of activities in each category of a plurality of categories of the project, wherein each of the activities includes a time duration;

transforming the time duration, for each uncompleted activity of the plurality of activities in each category of the plurality of categories, into an updated time duration based on at least one completed activity or partially completed activity in a corresponding category of the plurality of categories, wherein:

(i) at least some of the plurality of activities and the plurality of categories are dependently related to each other in time, and (ii) the transforming the time duration comprises:

displaying a graphical user interface including a table of completed activities and partially completed activities that are classified in at least a first category of the plurality of categories;

receiving a selection via the graphical user interface of a portion of the completed activities and partially completed activities including a first partially completed activity;

displaying, on the graphical user interface, a graph with a progress line depicting actual progress of the project that is generated based on at least the selection of the portion of the completed activities and the partially completed activities;

wherein the progress line is generated with a trend start point at a first point in time on the progress line and a trend finish point at a last point in time on the progress line that are designated on the progress line;

receiving, via the graphical user interface, a selection that drags and modifies at least the trend finish point on the progress line to a different location on the progress line to create and display a modified start/finish point pair and causing a change in a slope of a line between the modified start/finish point pair, and causing a completion date of the project to be recomputed and changed by:

(i) generating an extended line through the last point in time on the progress line where the extended line has a slope equal to the slope of the line between the modified start/finish point pair, and (ii) where a right-most point of the extended line on the graph corresponds to a new forecasted completion date;

computing a projected duration for the first partially completed activity based on the slope of the line between the modified start/finish point pair; and for a first uncompleted activity from the plurality of activities, transforming a time duration for the first uncompleted activity into an updated time duration for the first uncompleted activity, including based on the projected duration for the first partially completed activity;

displaying, concurrently with the progress line, check point indicia, wherein each check point indicia is associated with a check point data structure configured to receive data through the graphical user interface from a user;

in response to receiving a selection of a check point indicia, displaying data comprised within the check point data structure associated with the check point indicia for which the selection is received;

forecasting, by at least the processor, a completion date for each uncompleted activity of the plurality of activities for each category of the plurality of categories based on the modified start/finish point pair and on:
(i) the updated time duration for each uncompleted activity resulting from the transforming, and
(ii) how at least some of the plurality of activities and the plurality of categories are dependently related to each other in time;

forecasting, by at least the processor, a completion date for the project by rolling up time durations and completion dates for the plurality of activities across the plurality of categories;

transforming, by at least the processor, at least one data structure having data representative of the project based on at least the completion date for the project and the completion date for each uncompleted activity; and controlling the display screen, by at least the processor, to modify the graphical user interface for displaying at least the completion date for the project.

2. The method of claim 1, wherein transforming the time duration for the first uncompleted activity comprises:
adjusting a baseline end time of the time duration for the first uncompleted activity by extrapolating from the baseline end time to an adjusted end time based on the slope of the progress line between the trend start point and the trend finish point, wherein the adjusted end time occurs after the baseline end time.

3. The method of claim 1, wherein transforming the time duration for the first uncompleted activity comprises:
adjusting a baseline end time of the time duration for the first uncompleted activity by extrapolating from the baseline end time to an adjusted end time based on the slope of the progress line between the trend start point and the trend finish point, wherein the adjusted end time occurs before the baseline end time.

4. The method of claim 1, wherein transforming the time duration for the first uncompleted activity comprises:
calculating a percentage time deviation, between an actual time duration and a planned time duration, for each activity of the one or more completed activities; and
using the percentage time deviation for each activity of the one or more completed activities to determine the time duration for the first uncompleted activity.

5. The method of claim 4, wherein using the percentage time deviation for each activity of the one or more completed activities to determine the time duration extends the time duration for the first uncompleted activity from a specified time duration for the first uncompleted activity.

6. The method of claim 4, wherein using the percentage time deviation for each activity of the one or more completed activities to determine the time duration compresses the time duration for the first uncompleted activity from a specified time duration for the first uncompleted activity.

7. The method of claim 1, wherein the progress line represents progress of the first partially completed activity in project units versus time and the project units include one of man-hours, miles-of-road, cubic feet, or cubic meters.

8. A device, comprising:
a processor configured to execute a process; and
a memory configured to store instructions executable by the processor, wherein the process, when executed by the processor, is operable to:
analyze data representing a project and determining each uncompleted activity of a plurality of activities in each category of a plurality of categories of the project, wherein each of the activities includes a time duration;
transform the time duration, for each uncompleted activity of the plurality of activities in each category of the plurality of categories, into an updated time duration based on at least one completed activity or partially completed activity in a corresponding category of the plurality of categories, wherein:
(i) at least some of the plurality of activities and the plurality of categories are dependently related to each other in time, and
(ii) the process to transform the time duration is further operable to:
display on a display screen a graphical user interface including a table of completed activities and partially completed activities that have at least a first category of the plurality of categories;
receive a selection via the graphical user interface of a portion of the completed activities and partially completed activities including a first partially completed activity;
display, on the graphical user interface, a graph with a progress line depicting actual progress of the project that is based on at least the selection of the portion of the completed activities and the partially completed activities;
wherein the progress line is generated with a trend start point at a first point in time on the progress line and a trend finish point at a last point in time on the progress line that are designated on the progress line;
receive, via the graphical user interface, a selection that drags and modifies at least the trend finish point on the progress line to a different location on the progress line to create and display a modified start/finish point pair and causing a change in a slope of a line between the modified start/finish point pair that changes a completion date of the project to a new forecasted completion date by:
(i) generating an extended line through the last point in time on the progress line where the extended line has a slope equal to the slope of the line between the modified start/finish point pair, and
(ii) where a right-most point of the extended line on the graph corresponds to the new forecasted completion date;

compute a projected duration for the first partially completed activity based on the slope of the progress line between the modified start/finish point pair; and for a first uncompleted activity from the plurality of activities, transform a time duration for the first uncompleted activity into an updated time duration for the first uncompleted activity, including based on the projected duration for the first partially completed activity;

display, concurrently with the progress line, check point indicia, wherein each check point indicia is associated with a check point data structure configured to receive data through the graphical user interface from a user;

in response to receiving a selection of a check point indicia, display data comprised within the check point data structure associated with the check point indicia for which the selection is received;

forecast a completion date for each uncompleted activity of the plurality of activities for each category of the plurality of categories based on the modified start/finish point pair and on:
(i) the updated time duration for each uncompleted activity resulting from transforming the time duration, for each uncompleted activity of the plurality of activities in each category of the plurality of categories, into the updated time duration, and
(ii) how at least some of the plurality of activities and the plurality of categories are dependently related to each other in time;

forecast a completion date for the project by rolling up time durations and completion dates for the plurality of activities across the plurality of categories;

transform, at least one data structure having data representative of the project based on at least the completion date for the project and the completion date for each uncompleted activity; and control the display screen to modify the graphical user interface for displaying at least the completion date for the project.

9. The device of claim 8, wherein the process to transform the time duration for the first uncompleted activity is further operable to:
adjust a baseline end time of the time duration for the first uncompleted activity by extrapolating from the baseline end time to an adjusted end time based on the slope of the progress line between the trend start point and the trend finish point, wherein the adjusted end time occurs after the baseline end time.

10. The device of claim 8, wherein the process to transform the time duration for the first uncompleted activity is further operable to:
adjust a baseline end time of the time duration for the first uncompleted activity by extrapolating from the baseline end time to an adjusted end time based on the slope of the progress line between the trend start point and the trend finish point, wherein the adjusted end time occurs before the baseline end time.

11. The device of claim 8, wherein the process to transform the time duration for the first uncompleted activity is further operable to:
calculate a percentage time deviation, between an actual time duration and a planned time duration, for each activity of the one or more completed activities; and use the percentage time deviation for each activity of the one or more completed activities to determine the time duration for the first uncompleted activity.

12. The device of claim 8, wherein the progress line represents progress of the first partially completed activity in project units versus time and the project units include one of man-hours, miles-of-road, cubic feet, or cubic meters.

13. A non-transitory, computer-readable media having software encoded thereon, wherein the software, when executed by a processor, causes the processor to:

analyze data representing a project and determining each uncompleted activity of a plurality of activities in each category of a plurality of categories of the project, wherein each of the activities includes a time duration;

transform the time duration, for each uncompleted activity of the plurality of activities in each category of the plurality of categories, into an updated time duration based on at least one completed activity or partially completed activity in a corresponding category of the plurality of categories, wherein:
(i) at least some of the plurality of activities and the plurality of categories are dependently related to each other in time, and
(ii) the software to transform the time duration is further operable to:
display, on a display screen, a graphical user interface including a table of completed activities and partially completed activities that are classified in at least a first category of the plurality of categories;
receive a selection via the graphical user interface of a portion of the completed activities and partially completed activities including a first partially completed activity;
display, on the graphical user interface, a graph with a progress line depicting actual progress of the project that is generated based on at least the selection of the portion of the completed activities and the partially completed activities;
wherein the progress line is generated with a trend start point at a first point in time on the progress line and a trend finish point at a last point in time on the progress line that are designated on the progress line;
receive, via the graphical user interface, a selection that drags and modifies at least the trend finish point on the progress line to a different location on the progress line to create and display a modified start/finish point pair and causing a change in a slope of a line between the modified start/finish point pair, and causing a completion date of the project to be recomputed and changed to a new forecasted completion date by:
(i) generating an extended line through the last point in time on the progress line where the extended line has a slope equal to the slope of the line between the modified start/finish point pair, and
(ii) where a right-most point of the extended line on the graph corresponds to the new forecasted completion date;
compute a projected duration for the first partially completed activity based on the slope of the progress line between the modified start/finish point pair; and
for a first uncompleted activity from the plurality of activities, transform a time duration for the first uncompleted activity into an updated time duration for the first uncompleted activity, including based on the projected duration for the first partially completed activity;

display, concurrently with the progress line, check point indicia, wherein each check point indicia is associated with a check point data structure configured to receive data through the graphical user interface from a user;

in response to receiving a selection of a check point indicia, display data comprised within the check point data structure associated with the check point indicia for which the selection is received;

forecast a completion date for each uncompleted activity of the plurality of activities for each category of the plurality of categories based on the modified start/finish point pair and on:
  (i) the updated time duration for each uncompleted activity resulting from transforming the time duration, for each uncompleted activity of the plurality of activities in each category of the plurality of categories, into the updated time duration, and
  (ii) how at least some of the plurality of activities and the plurality of categories are dependently related to each other in time;

forecast a completion date for the project by rolling up time durations and completion dates for the plurality of activities across the plurality of categories;

transform, at least one data structure having data representative of the project based on at least the completion date for the project and the completion date for each uncompleted activity; and control the display screen to modify the graphical user interface for displaying at least the completion date for the project.

14. The non-transitory, computer-readable media of claim 13, wherein the software to transform the time duration for the first uncompleted activity is further operable to:
 adjust a baseline end time of the time duration for the first uncompleted activity by extrapolating from the baseline end time to an adjusted end time based on the slope of the progress line between the trend start point and the trend finish point, wherein the adjusted end time occurs after the baseline end time.

15. The non-transitory, computer-readable media of claim 13, wherein the software to transform the time duration for the first uncompleted activity is further operable to:
 adjust a baseline end time of the time duration for the first uncompleted activity by extrapolating from the baseline end time to an adjusted end time based on the slope of the progress line between the trend start point and the trend finish point, wherein the adjusted end time occurs before the baseline end time.

16. The non-transitory, computer-readable media of claim 13, wherein the software to transform the time duration for the first uncompleted activity is further operable to:
 calculate a percentage time deviation, between an actual time duration and a planned time duration, for each activity of the one or more completed activities; and
 use the percentage time deviation for each activity of the one or more completed activities to determine the time duration for the first uncompleted activity.

17. The non-transitory, computer-readable media of claim 13, wherein the progress line represents progress of the first partially completed activity in project units versus time and the project units include one of man-hours, miles-of-road, cubic feet, or cubic meters.

* * * * *